United States Patent

[11] 3,593,507

| [72] | Inventor | William F. Mohr |
| | | Laurel, Nebr. 68745 |
| [21] | Appl. No. | 644,452 |
| [22] | Filed | June 5, 1967 |
| [45] | Patented | July 20, 1971 |

[54] DEVICE FOR GATHERING SOYBEAN CROPS
2 Claims, 4 Drawing Figs.

| [52] | U.S. Cl. | 56/119 |
| [51] | Int. Cl. | A01d 45/02 |
| [50] | Field of Search | 56/94, 95, 109, 110, 119 |

[56] References Cited
UNITED STATES PATENTS

| 1,419,347 | 6/1922 | Baird | 56/95 |
| 2,399,774 | 5/1946 | Welty | 56/95 |
| 2,949,717 | 8/1960 | Johannesen | 56/119 X |
| 3,119,221 | 1/1964 | Martin | 56/119 |
| 3,173,236 | 3/1965 | Byrd | 56/119 |

Primary Examiner—Louis G. Mancene
Assistant Examiner—J. A. Oliff
Attorney—Lucas J. De Koster ABSTRACT: An improved harvesting device for soybeans or the like having rotating frustoconical lifting members to raise the bean vine to a cutting height. Vanes on the conical shape assist in the lifting. Internal motors in the cones provide a clear path for the harvested vine to be carried into the harvesting machine.

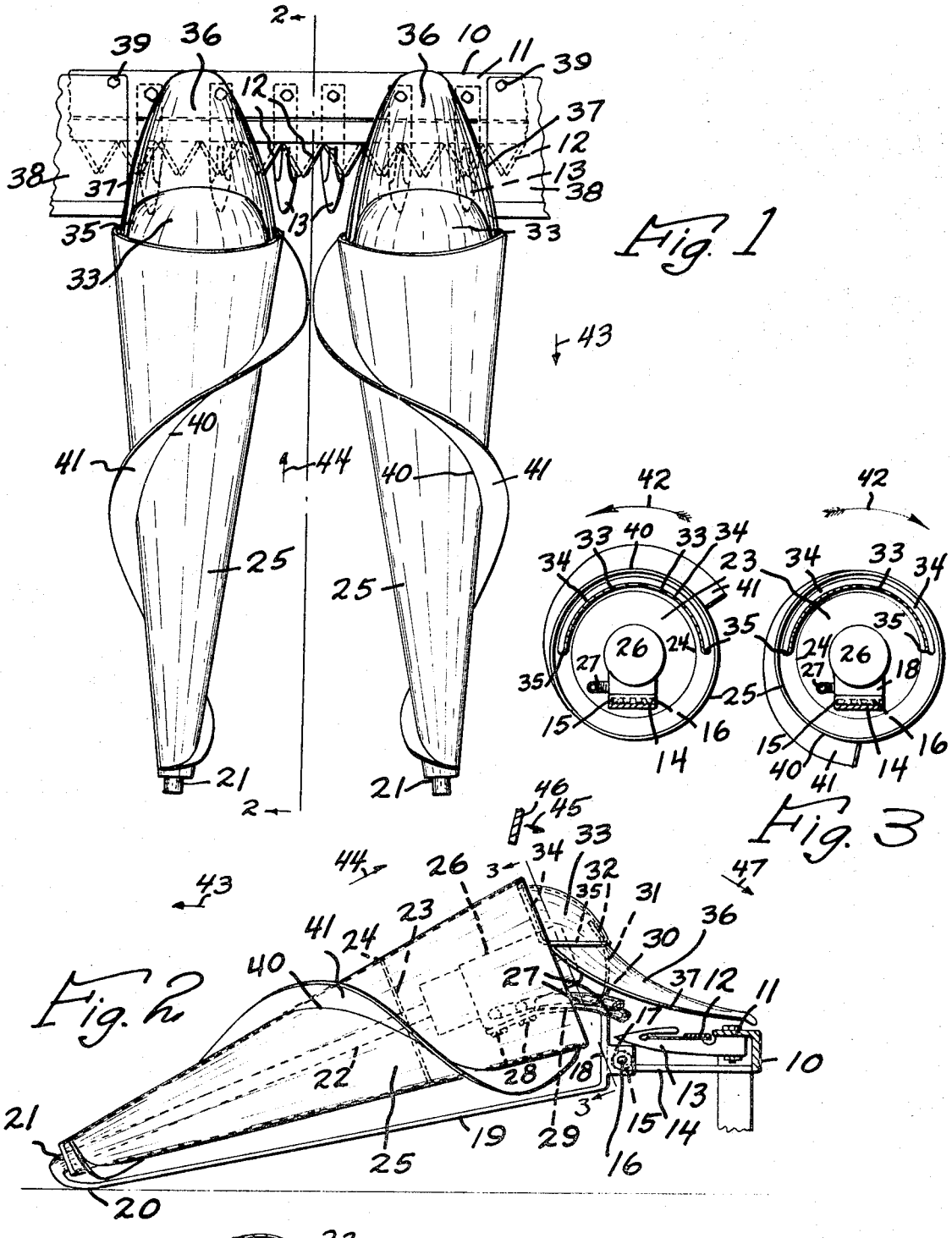

DEVICE FOR GATHERING SOYBEAN CROPS

My invention relates to a soybean crop gathering device.

An object of my invention is to provide a gathering device wherein the soybeans will be efficiently raised and discharged rearwardly into the usual combine, etc.

A further object of my invention is to provide an easily operable drive mechanism and a certain conical and spiral blade structure for assisting in the crop raising and delivering action.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIG. 1 is a plan view of my device,

FIG. 2 is a sectional view of FIG. 1 taken substantially along the line 2-2 thereof, FIG. 3 is a sectional view taken substantially along the line 3-3 of FIG. 2, and FIG. 4 is a modification.

My invention contemplates the provision of a simple yet efficient gathering device principally for the purpose of gathering a soybean crop and raising the same from its lower position and thence discharging the same into a combine unit, and in a compact structure wherein the gathering units are arranged in pairs and wherein any number of pairs can be used when desired.

In now describing my invention, I have used the character 10 to designate a framework portion of the usual harvester or combine, the character 11 indicating a further portion, the character 12 the reciprocating blades and the character 13, the guards.

I have further used the character 14 to indicate support straps (See FIG. 2) which extend into the curled portions at 15 through which pass the pins 16, the pins 16 passing through the ears 17 which are attached to the portions 18 which in turn extend into the integral further portions 19.

The portions 19 extend into the skid portions 20 to which are secured the bearings 21, and received in the bearings 21 are the lower ends of the shafts 22. Attached to the shafts 22 are the discs 23 which are secured at their peripheries 24 to the substantially conical members 25.

The shafts 22 are directly connected to the hydraulic motors 26 which include the pairs of hydraulic tubes 27 communicating therewith to drive the same, said tubes being connected to the power source of the tractor, etc. Attached to the motors 26 at 28 are the bracket members 29 which are secured at 30 to the upper part of the members 18, and which continue into the further support members 31. The members 31 are attached as at 32 to the upper guards 33 which are substantially arcuate in shape as shown and which include the curled flange portions 34 and 35 to entrap stray beans, etc., so that they will not fall into the cones, and also attached to the brackets 31 are further lower guard members 36 having the curled flange portions 37 for the same purposes, it being noted that these guards will protect the hydraulic motors and the further portions.

The character 38 indicates further guard members (see FIG. 1) which are bolted as at 39 to the framework and which can be placed between pairs of the gathering members.

Attached as at 40 to the conical members 25 are the helically arranged blades 41 pitched approximately as shown.

The hydraulic motors are adapted to rotate the cones 25 in opposite directions or in the directions of the arrows 42 (see FIG. 3).

The device operates in the following manner. As explained above there will be provided a pair of cones 25 etc. for each crop row, only one pair being described herein.

As the unit which carries the device travels forwardly in the direction of the arrow 43, the hydraulic motors 26 are operated, which will rotate the cones 25 as well as the blades 41 and during this travel, these blades will force the crop in the direction of the arrow 44 and at the same time due to the angular positioning of the cones 25 will raise the crop upwardly and then the crop will be directed in the direction of the arrow 45 (see FIG. 2) by the slats 46 of the usual driven reel on the combine. The crop is also then cut by the blades 12 and will be delivered downwardly in the direction of the arrow 47 (see FIG. 2) into the auger which is positioned adjacently to the framework 10. During the movement of the cut material downwardly in this direction, the guards 33 and 36 will protect the mechanism such as the motor and the like and so that the beans will not enter into the cones, the curved portions at 35, 36 and 37 also preventing this material from entering where not desired.

It will be noted from FIG. 3 especially that the rotation of the cones in opposite directions and in the directions of the arrows 42, will cause the crop to be naturally raised due to the formation of the blades 41.

This arrangement thereby provides a simple method for driving the cones and helical blade structures in an efficient and relatively compact structure.

The member 19 will readily pivot at 16, the skid portions 20 permitting free movement along the ground.

FIG. 4 illustrates a slight modification with identical characters indicating identical parts, however in this structure the scalloped structure 48 can be provided on the members 41 to assist in the raising action.

It will now be noted that I have provided the advantages mentioned in the objects of my invention, with further advantages being apparent.

Some changes may be made in the construction and arrangement of the parts of my invention without departing from the real spirit and purpose of my invention.

I claim as my invention:

1. A device for gathering soybeans crops or the like comprising a pair of laterally spaced, longitudinally positioned, rotatable, conical members, the apices of said conical members being positioned forwardly, said conical members sloping downwardly toward said apices, helically arranged blades on the periphery of each conical member adapted to direct crop material upwardly and rearwardly as said conical members are rotated and moved forwardly, frame means supporting said conical members, shaft means for said conical members journaled on said frame means, and drive means connected to said shaft means for rotating said shaft means and said conical members and including individual motors for each conical member, each motor being enclosed in its driven conical member.

2. The structure of claim 1 and including guard members adapted to cover said motors.